(12) United States Patent
Yang et al.

(10) Patent No.: US 12,244,695 B2
(45) Date of Patent: Mar. 4, 2025

(54) ASSOCIATING PRE-SHARED KEYS WITH CLIENT DEVICES BASED ON MESSAGE INTEGRITY CHECK VALUES

(71) Applicant: HEWLETT PACKARD ENTERPRISE DEVELOPMENT LP, Houston, TX (US)

(72) Inventors: Ruiyao Yang, Beijing (CN); David Wilson, San Jose, CA (US); Zhou Wang, Beijing (CN); Youhe Zhang, Beijing (CN); Feng Ding, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 254 days.

(21) Appl. No.: 18/050,083

(22) Filed: Oct. 27, 2022

(65) Prior Publication Data

US 2024/0146512 A1 May 2, 2024

(51) Int. Cl.
*H04L 9/40* (2022.01)
*H04L 9/08* (2006.01)
*H04L 9/32* (2006.01)

(52) U.S. Cl.
CPC ............ *H04L 9/0825* (2013.01); *H04L 9/085* (2013.01); *H04L 9/3242* (2013.01)

(58) Field of Classification Search
CPC ...... H04L 9/0825; H04L 9/085; H04L 9/3242
See application file for complete search history.

(56) References Cited

U.S. PATENT DOCUMENTS 6,598,057 B1 * 7/2003 Synnestvedt ............. H04L 9/40
7,370,350 B1 * 5/2008 Salowey ............... G06F 21/445
713/168

(Continued)

OTHER PUBLICATIONS

Secure W2; "Simplifying WPA2-Enterprise and 802.1x"; downloaded from https://www.securew2.com/solutions/wpa2-enterprise-and-802-1x-simplified, on Oct. 26, 2022; 22 pp.

(Continued)

*Primary Examiner* — Ghodrat Jamshidi
(74) *Attorney, Agent, or Firm* — Trop, Pruner & Hu, P.C.

(57) ABSTRACT

A process includes accessing a first message that is sent from an access point device. The first message includes data representing a second message that is sent by a client device. The second message is part of an exchange of messages between the client device and the access point device associated with authentication of the client device and a derivation of a first key used to encrypt and decrypt data communicated between the client device and the access point device. The second message includes a first message integrity check value. The process includes identifying, based on the second message, a pre-shared key corresponding to the client device. The identification of the pre-shared key includes determining a second message integrity check value based on a candidate pre-shared key of a plurality of candidate pre-shared keys; comparing the second message integrity check value with the first message integrity check value; and based on a result of the comparison, selecting the given candidate pre-shared key as the pre-shared key. The process includes determining a user role based on the pre-shared key. The process includes causing a third message to be sent to the access point device, where the third message includes data representing the pre-shared key and data representing the user role.

19 Claims, 7 Drawing Sheets

(56) References Cited

U.S. PATENT DOCUMENTS

| | | | |
|---|---|---|---|
| 2007/0280481 A1 | 12/2007 | Eastlake et al. | |
| 2008/0063205 A1* | 3/2008 | Braskich | H04L 63/0892 |
| | | | 380/270 |
| 2009/0287922 A1* | 11/2009 | Herwono | H04L 9/321 |
| | | | 380/279 |
| 2014/0126911 A1* | 5/2014 | Jovicic | H04B 10/116 |
| | | | 398/116 |
| 2017/0230824 A1* | 8/2017 | Li | H04L 63/123 |
| 2018/0278625 A1* | 9/2018 | Cammarota | H04L 9/3268 |
| 2019/0190910 A1* | 6/2019 | Min | H04L 63/10 |
| 2021/0036988 A1* | 2/2021 | McKibben | H04W 12/06 |
| 2021/0099873 A1* | 4/2021 | Windsor | H04L 63/0892 |
| 2022/0060899 A1* | 2/2022 | Harding | H04W 12/069 |
| 2022/0272089 A1 | 8/2022 | Mohammed et al. | |

OTHER PUBLICATIONS

Wi-Fi Professionals; "4-Way Handshake"; downloaded from https://www.wifi-professionals.com/2019/01/4-way-handshake#:~:text=What is 4-way Handshake, data sent over Wireless medium, on Oct. 26, 2022; 21 pp.

Phoenix Pro; Home/Blog/"How to Add Devices to Aruba Central"; Oct. 12, 2020; downloaded from https://phoenixpro.club/how-to-add-devices-to-aruba-central/, on Oct. 26, 2022; 17 pp.

* cited by examiner

ASSOCIATING PRE-SHARED KEYS WITH CLIENT DEVICES BASED ON MESSAGE INTEGRITY CHECK VALUES

BACKGROUND

A wireless-capable client device may wirelessly connect to a wireless access point device for purposes of accessing a network. When a client device first connects to a wireless access point device, the client device and the wireless access point device may exchange messages as part of a process to onboard the client device. Through the exchange of messages, the client device and the wireless access point device may mutually authenticate each other. One way for a first network device to authenticate a second network device is for the first network device to determine whether the second network device possesses the same pre-shared key (e.g., a passphrase or a password) as the first network device.

DETAILED DESCRIPTION

Figure 1:
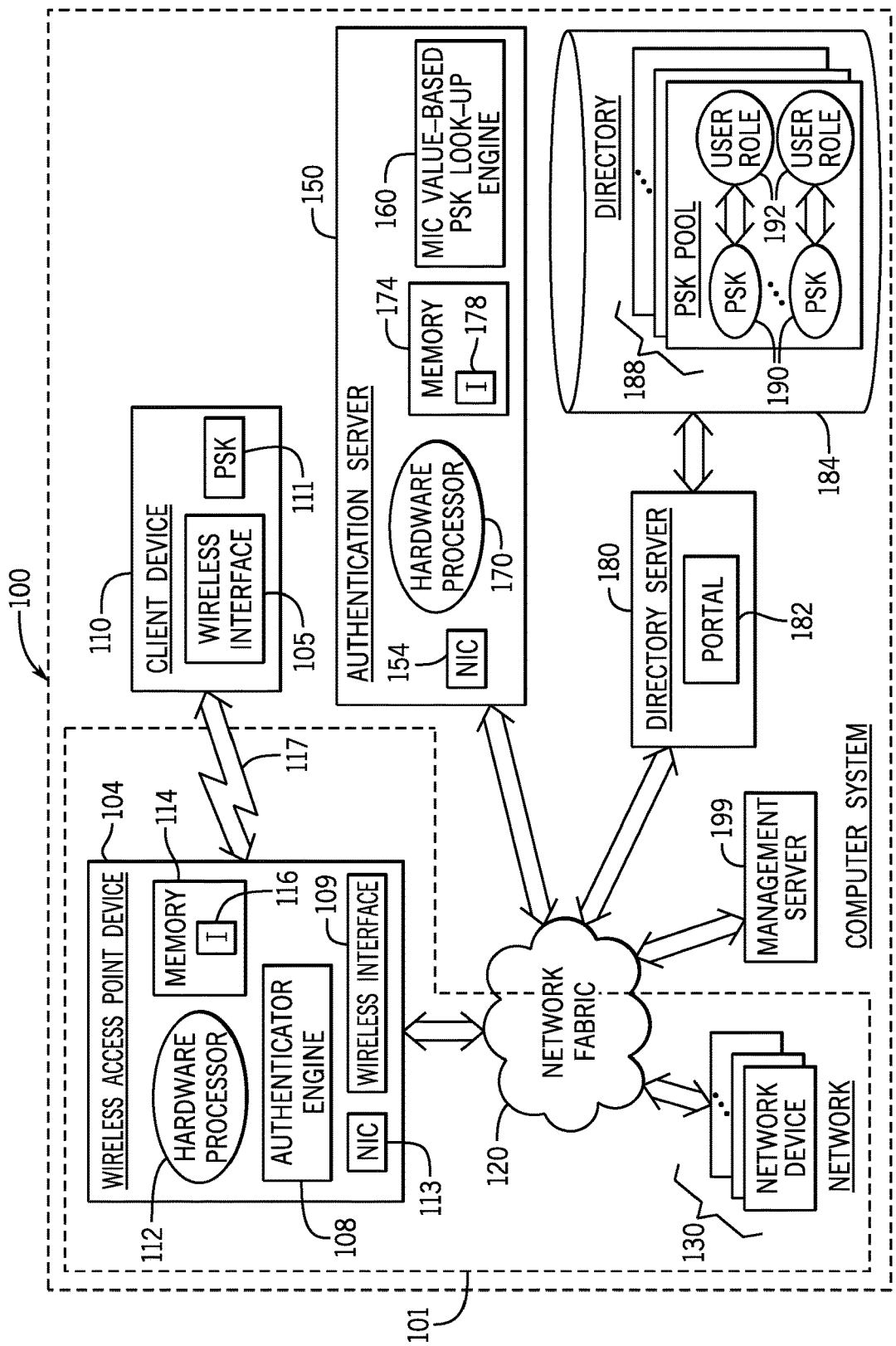
FIG. 1 is a block diagram of a computer system that includes a wireless access point device, a wireless-capable client device and an authentication server according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

A wireless-capable client device (also called a "client station," a "mobile station," a "mobile device," a "supplicant," or "supplicant device"), when first connected to a wireless access point device, may communicate a sequence of management packets, or frames (e.g., key frames), with the wireless access point device as part of a process to onboard the client device. In general, an onboarding process is a mechanism by which a client device gains access to a network. The network may be a wireless local area network (WLAN), and the wireless access point device may function as a gatekeeper for purposes of allowing or denying the client device access to the network via a wireless connection with the wireless access point device. The sequence of management frames corresponds to an exchange of messages between the wireless access point device, which allows the client device and the wireless access point device to mutually authenticate each other and allows the client device to associate with the wireless access point device.

The wireless access point device's authentication of the client device may include the wireless access point device verifying that the client device possesses the same pre-shared key (e.g., a password or a passphrase) as the wireless access point device. A pre-shared key may be a sequence of alphanumeric characters (e.g., a sequence of numbers, letters and special characters) that, as its name implies, is shared by network devices, such as a client device and a wireless access point device. The wireless access point device's verification of whether the client device possesses the same pre-shared key does not involve the client device sending the pre-shared key to the wireless access point device across the wireless connection. Rather, the exchange of messages provides other information that may be used by the wireless access point device to prove that the client device possesses the same pre-shared key as the wireless access point device. In a similar manner, the exchange of messages provides information that may be used by the client device to prove that the wireless access point device possesses the same pre-shared key as the client device.

One approach to control access to a network is to use a single, pre-shared key (PSK) for a wireless access point device so that all client devices may use the same pre-shared key (PSK) to connect to the wireless access point device. However, this approach may be a rather ineffective way to securely control network access. For example, although network access may be intended for a particular group of users, a compromised client device or an unintended PSK exposure may allow a user outside of the group to use the PSK to gain access to the network.

Another relatively more secure approach to control network access involves client devices using different pre-shared keys, or "multi pre-shared keys" (MPSKs), which refers to a pool of PSKs for a given wireless access point device. As compared to all users of a wireless access point device sharing a single PSK, with MPSKs, different users can use different respective PSKs. In this manner, different PSKs may be generated for different client devices, and the PSKs may be pre-registered with a directory of the network so that each client device may use its PSK to access the network. In this context, "pre-registering" (also referred to herein as "registering") a PSK refers to one or multiple actions being taken to configure the network to recognize the PSK for a client device before the client device connects to the network using the PSK. The pre-registration may involve a user of the client device registering a PSK for the client device or another person (e.g., a network or system administrator) registering the PSK on behalf of the user of the client device.

As an example, through pre-registration, user A may assign a first PSK to each client device of a group of devices associated with user A, and user B may assign a second PSK to each client device of a group of devices associated with user B. As another example, a given user may assign a different PSK to each client device that is associated with the user. The use of PSKs allows more stringent network access control, as compared to using a single pre-shared key, given that each PSK has a more restricted scope of use.

An enterprise network may have an authentication server that, as part of the onboarding process for a client device, retrieves the PSK for the client device from a directory and provides the retrieved PSK to the wireless access point device. The client device and wireless access point device may then exchange messages as part of the onboarding process for purposes of each device determining whether the other device possess the same PSK.

One approach to allow an authentication server to identify the correct PSK for a client device involves the network storing client device identifying information, which is obtained as part of the PSK pre-registration. As a more specific example of this approach, the pre-registration of a PSK for a client device may involve, in addition to providing the PSK, providing a media access control (MAC) address of the client device. Therefore, as part of the onboarding of a particular client device, the authentication server may use the client device's MAC address to identify the PSK for the client device and provide the identified PSK to the wireless access point device. PSK pre-registration that involves providing client device MAC addresses, however, may be prone to human error, as it is possible that the correct MAC address will not be entered in the pre-registration. Moreover, PSK pre-registration that involves providing the client device MAC address may be rather burdensome on the user, as it involves the potentially painstaking task of the user determining the MAC address for each registered client device.

An alternative approach, which avoids registering client identifying information, such as client device MAC addresses, is to implement a network access policy that allows all client devices to access the network (e.g., a policy that allows all client device MAC addresses to access the network). Such an approach, however, may be relatively unsecure, as unintended users and client devices may potentially access the network.

In accordance with example implementations that are described herein, a network includes an authentication server and a wireless access point device that functions as an authenticator. The authentication server associates and retrieves a PSK (herein called the "client device PSK") for a given client device without using client device identifying information, such as the client device's MAC address. More specifically, in accordance with example implementations, the authentication server identifies the client device PSK (from a pool of pre-registered candidate PSKs) based on vendor specific attributes (VSA) for the client device, which do not include specific client device identifying information, such as the client device's MAC address. In accordance with example implementations, the wireless access point device derives the VSA for a given client device based in part on the content of a message (called "Message2" herein) that is sent by the client device to the wireless access point device during the onboarding of the client device. As described further herein, in accordance with example implementations, the content of Message2 corresponds to proof that the client device possesses the client device PSK. Moreover, Message2 contains a message integrity check (MIC) value (called the "Message2 MIC value" herein) that cryptographically binds the content of Message2 to the client device PSK. The authentication server may use the Message2 MIC value to identify the client device PSK from the pool of candidate PSKs, as described further herein.

A MIC value, in general, is a cryptographic hash value that a sender of a message adds to the message for purposes of allowing a recipient of the message to use the hash value to verify that the message arrived intact and has not been altered. A MIC value may be generated by a keyed cryptographic hash function that has the content of a message and a cryptographic key as inputs.

In accordance with some implementations, a MIC value for a message may be generated by preprocessing the message to set all of the bits of a MIC field of the message to zero. Otherwise, the content of the message is not changed. Next, a keyed cryptographic hash function may be applied to all fields of the entire pre-processed message (which has the MIC field bits zeroed) to generate the MIC value. Here, the entire message means all fields of the message, i.e., the entire message content. The generated MIC value may then be added to the MIC field of the preprocessed message to generate the final message that may then be transmitted. The MIC value may be generated in any of a number of different ways, in accordance with further implementations. For example, in accordance with further implementations, a MIC value may be generated based on one or multiple field(s) of the message and not be based on the entire message content. As another example, in accordance with further implementations, a MIC value may be generated based on all fields of the message, except for the MIC field. As another example, in accordance with further implementations, a MIC value may be generated based on the entire message, with the bits of the MIC field being set to value(s) other than zero. Regardless of how the MIC value is generated, in accordance with example implementations, the MIC value for Message2 and the candidate MICs that are generated by the authentication server 150 (as further described herein) are generated using the same methodology.

As described further herein, the client device generates the Message2 MIC value using a keyed cryptographic hash function that has the content of Message2 and a key that is derived from the client device PSK as inputs. The Message2 MIC value "cryptographically binding" the content of Message2 to the client device PSK, in this context, refers to the Message2 MIC value associating the Message2 content with the client device PSK.

A MIC value may cryptographically bind a message content to multiple cryptographic keys of a key derivation lineage. For example, a first cryptographic key may be derived from a second cryptographic key, and the first cryptographic key may be the key input to the keyed cryptographic hash function. For this example, the MIC value cryptographically binds the message content to the first cryptographic key, and the MIC value also cryptographically binds the message content to the second cryptographic key.

As a more specific example, in accordance with example implementations that are described further herein, the Message2 MIC value may be derived using a keyed cryptographic hash function that has the content of the message and a key confirmation key (KCK) as its inputs. The Message2 MIC value cryptographically binds the message content to the KCK. The KCK is part of a pairwise transient key (PTK), and the Message2 MIC value further cryptographically binds the message content to the PTK. The PTK may be derived from a pairwise master key (PMK), and the Message2 MIC value further cryptographically binds the message content to the PMK. The PMK may be derived from a PSK, and the Message2 MIC value also cryptographically binds the content of Message2 to the PSK.

In accordance with example implementations, the authentication server determines whether a given candidate PSK (of a pool of candidate PSKs) is the client device PSK by determining a MIC value (called the "candidate MIC value" herein) based on the candidate PSK. More specifically, in accordance with example implementations, the authentication server calculates the candidate MIC value using the same keyed cryptographic hash function and the same MIC generation methodology that are used by the client device to generate the Message2 MIC value. In this manner, the authentication server calculates the candidate MIC value by applying the candidate PSK and the Message2 content as inputs to the keyed cryptographic hash function. If the candidate MIC value is the same as the Message2 MIC value, then, in accordance with example implementations, the candidate PSK is the client device PSK. After the authentication server identifies the client device PSK, the authentication server may then determine an access privilege level (e.g., a user role) that is associated with the client device PSK and send a message containing the client device PSK and the user role to the wireless access point device. Among the potential advantages of using MIC values to associate client devices with PSKs, network access is securely controlled, while reducing the burden otherwise associated with pre-registering the PSKs.

Referring to FIG. 1, as a more specific example, in accordance with some implementations, a computer system 100 includes one or multiple wireless-capable client devices 110, and one or multiple wireless access point devices 104. FIG. 1 depicts an example client device 110 having a wireless connection 117 with an example wireless access point device 104. In accordance with example implementations, the wireless connection 117 may refer to a connection associated with the use of the Wi-Fi family of protocols that are set forth in the Institute of Electrical and Electronics Engineers (IEEE) 802.11-2016 standard, which published on Dec. 14, 2016 (and is herein referred to as "IEEE 802.11 standard"). For this example, the client device 110 has a wireless interface 105, and the wireless access point device 104 has a wireless interface 109. The wireless access point device 104, in general, serves as an authenticator, or gatekeeper, to control access to a network 101 (e.g., a WLAN).

As described further herein, in accordance with example implementations, the wireless access point device 104 sends information acquired as part of an exchange of messages with the client device 110 to an authentication server 150 of the network 101. For this purpose, the wireless access point device 104 may have a network interface, such as a network interface controller 113, and the authentication server 150 may have a network interface, such as a network interface controller 154. The authentication server 150, based on the information that is sent by the wireless access point device 104, provides, to the wireless access point device 104, a client device PSK and a user role that is associated with the client device PSK.

In the context used herein, a "user role" refers to an access privilege category that may be assigned to a user or group of users for purposes of associating the user(s) with a scope of allowable access to the network infrastructure. As an example, a user role may be a network administrator role that allows creation, configuration and management of network application services and network devices. As another example, a user role may be a particular job title, enterprise group or level of an enterprise hierarchy that has an associated set of access privileges. As examples, the access privileges may include read-only access, write access, a bandwidth contract, a bandwidth limit, a time-of-day restriction, a duration of use allocation, a reauthorization frequency, an application service access, an access to certain network devices, a denial of network access, or any other privilege that affects a right and/or ability that is associated with the network infrastructure.

In accordance with example implementations, the computer system 100 may be a cloud-based computing system, and the authentication server 150 and the directory server 180 may be cloud-based servers. Moreover, depending on the particular implementation, the cloud-based computing system may be a public computing system, a private computing system or a hybrid computing system. In accordance with further example implementations, the computer system 100 may be a private, non-cloud-based computing system. In accordance with some implementations, the network 101 may be a private network, such as a WLAN, and the authentication server 150 may be a cloud-based entity.

The wireless access point device 104 may have any of a number of different forms, depending on the particular implementation. As examples, the wireless access point device 104 may be a router, a network switch, a network bridge, a computer platform, or any other device that has a wireless interface and controls access to a network. In the context that is used herein, a "computer platform" refers to a processor-based electronic device, which has an operating system.

The client device 110 may have any of a number of different architectures in accordance with many possible implementations. In accordance with some implementations, the client device 110 may be a computer platform, which may or may not be portable. As examples, the client device 110 may be an Internet of Things (IoT) device; a sensor; a wearable computer; a process controller; an access point device; a Wi-Fi pod device; a Wi-Fi extender device; a desktop computer, a portable computer, a laptop computer, a notebook computer, a tablet computer, a smartphone, a wearable computer, or any other electronic device that has a communication interface that is capable of communicating with an access point device.

As depicted in FIG. 1, the client device 110 possesses a PSK (called the "client device PSK 111" herein). In this manner, the client device 110 has been configured with the client device PSK. Criteria for the client device 110 joining the network 101 include both the wireless access point device 104 and the client device 110 possessing the same PSK. As further described herein, the authentication server 150 identifies a particular PSK 190 (of a pool 188 of candidate PSKs 190) as being the client device PSK 111 and provides the identified PSK to the wireless access point device 104. As depicted in FIG. 1, each PSK 190 may be associated with a user role 192, and the authentication server 150 may provide both the identified PSK 190 and its associated user role 192 to the wireless access point device 104.

In accordance with example implementations, a directory server 180 of the network 101 controls access to one or multiple pools 188 of PSKs 190, where each pool 188 may be, for example, associated with a particular wireless access point device 104 of the network 101. In accordance with further implementations, the PSKs 190 may be grouped into different pools 188 according to criteria other than wireless access point device identities. In accordance with some implementations, the directory server 180 may be separate from the authentication server 150. In accordance with further implementations, the authentication server 150 and directory server 180 may be hosted on the same computer platform. Moreover, in accordance with yet further implementations, the directory server 180 or the authentication server 150 may be distributed among multiple computer platforms, and these computer platforms may be local to each other or geographically distributed.

The wireless access point device 104, the authentication server 150 and other network devices 130 of the network 101 may communicate via network fabric 120. In general, the network fabric 120 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

The authentication server 150, in accordance with example implementations, may be a computer platform. As examples, the authentication server 150 may be a standalone server; a rack-mounted server module; an edge processing, rack-mounted module; a server blade; a blade enclosure containing one or multiple server blades; or any another computer platform having a network interface.

In accordance with some implementations, the authentication server 150 may communicate messages with the wireless access point device 104 according to a Remote Authentication Dial-In User Service (RADIUS) protocol. In general, RADIUS is a client/server protocol that may be used for purposes of a server (such as authentication server 150) authenticating and authorizing connections with a network. As further described herein, in accordance with example implementations, the authentication server 150 may communicate with the wireless access point device 104 using RADIUS protocol messages for purposes of providing the wireless access point device 104 information from which the wireless access point device 104 may use to allow or deny a client device 110 network access.

As an example, the RADIUS protocol messages may include a RADIUS MAC Authorization-Access message, which is sent by the wireless access point device 104 to the authentication server 150 for purposes of requesting the client device PSK 111 and a user role that is associated with the client device PSK 111. As another example, the RADIUS protocol messages may include messages provided by the authentication server 150 responsive to the MAC Authorization-Access message. As an example, the response by the authentication server 150 may be a RADIUS Access-Accept message that provides the client device PSK 111 and user role to the wireless access point device 104. The wireless access point device 104 may then use the client device PSK 111 to make sure that a four-way handshake (described herein) with the client device 110 completes, and when the four-way handshake completes, the wireless access point device 104 allows the client device 110 to join the network 101. As another example, the response by the authentication server 150 may be a RADIUS Access-Reject message that denies a client device 110 from joining the network 101 and causes the wireless access point device 104 to disassociate the client device 110.

The client device 110 may initially be in a state in which the client device 110 is neither authenticated nor associated with the wireless access point device 104. The client device 110 may initiate an onboarding process to join the network 101, and this onboarding process may involve the communication of management packets, or frames (e.g., key frames), between the client device 110 and the wireless access point device 104. In accordance with example implementations, for the onboarding process, the wireless access point device 104 restricts the communication between the client device 110 and the wireless access point device 104 to management frames (e.g., the wireless access point device 104 may drop data frames sent by the client device 110) until the client device 110 transitions to a state in which the client device 110 is associated with the wireless access point device 104 and the client device 110 has passed what is referred to herein as a "high-level authentication."

As a more specific example, the onboarding process for the client device may include the client device 110 first communicating with the wireless access point device 104 as part of a "low-level authentication." In this context, a "low-level authentication" refers to a preliminary authentication, which does not involve the client device 110 and the wireless access point device 104 determining whether the other device possesses the client device PSK 111. As an example, the low-level authentication may be an open system authentication that is described in the IEEE 802.11 standard. As a more specific example, the client device 110 may send an IEEE 802.11 authentication frame to the wireless access point device 104. The wireless access point device 104 may then respond to the authentication frame with an authentication response frame, which places the client device 110 in a state in which the client device 110 has been low-level authenticated and has not yet been associated with the wireless access point device 104.

Next, as part of the onboarding process, the client device 110 may send an association request frame to the wireless access point device 104. The association request frame may contain data that represents attributes (e.g., encryption types, supported rates, supported channels, quality of service (QoS) capability, and other attributes) of the client device 110. Assuming the attributes of the client device 110 match attributes of the wireless access point device 104, then the wireless access point device 104 may send an association frame that contains an association identifier (ID) for the client device 110. At this point, the client device 110 has a state in which the client device 110 is low-level authenticated and is associated with the wireless access point device 104.

After the low-level authentication and association of the client device 110 with the wireless access point device 104, the onboarding process may further include the client device 110 and the wireless access point device 104 undergoing a mutual, high-level authentication. In this context, "high-level authentication" generally refers to a process that includes the client device 110 and the wireless access point device 104 determining that the other device possesses the client device PSK 111. In accordance with example implementations, the high-level authentication includes an exchange of messages between the client device 110 and the wireless access point device 104 that 1. allows the client device 110 to prove to the wireless access point device 104 that the client device 110 possesses the client device PSK 111; and 2. allows the wireless access point device 104 to prove to the client device 110 that the wireless access point device 104 possess the client device PSK 111. Moreover, in accordance with example implementations, the exchange of messages, in addition to allowing high-level authentication, provides information from which the wireless access point device 104 and the client device 110 derive cryptographic keys that the devices use to encrypt and decrypt data communicated between the devices.

In accordance with example implementations, the wireless access point device 104 includes an authenticator engine 108 that generates messages that are sent by the wireless access point device 104 to the client device 110 and processes messages received by the wireless access point device 104 from the client device 110 as part of the exchange of messages for high-level authentication. Moreover, as further described herein, in accordance with example implementations, the authenticator engine 108 generates and processes messages that are communicated with the authentication server 150 for purposes of retrieving the client device PSK 111 and the user role for the client device 110. As described herein, in accordance with example implementations, the authenticator engine 108 generates a RADIUS MAC Authorization-Access message containing the VSA for the client device 110. The wireless access point device 104 sends the RADIUS MAC Authorization-Access message to the authentication server 150. The authentication server 150, based on the VSA, identifies a particular PSK 190 as being the client device PSK 111, identifies a user role associated with the client device PSK, and sends the client device PSK 111 and the user role to the wireless access point device 104. As an example, the message sent by the authentication server 150 may be a RADIUS Accept-Accept message containing the client device PSK 111 and the user role, and the authenticator engine 108 processes this message to extract the client device PSK 111 and the user role.

As further described herein, in accordance with example implementations, the high-level authentication includes a specific client device-provided message called "Message2." Message2 includes content that may be used to prove to the wireless access point device 104 that the client device 110 possesses the client device PSK 111. The VSA that are sent to the authentication server 150, among other attributes, include the content of Message2, and the content includes a Message2 MIC value.

In accordance with example implementations, the authentication server 150 includes a MIC value-based PSK look-up engine 160 (called the "PSK look-up engine 160" herein) that, in addition to generating and processing messages that are communicated with the wireless access point device 140, retrieves the client device PSK 111 based on the VSA that are provided by the wireless access point device 104. For purposes of identifying the client device PSK 111 and providing the identified client device PSK 111 to the wireless access point device 104, the PSK look-up engine 160 may first retrieve a pool 188 of candidate PSKs 190. As its name implies a "candidate" PSK 190 refers to a PSK that may or may not be the client device PSK 111. The PSK look-up engine 160, based on the Message2 MIC value that is contained in the VSA, evaluates the candidate PSKs 190 for purposes identifying the candidate PSK 190 that is the client device PSK 111.

In accordance with some implementations, the VSA may contain data identifying the wireless access point device 104, such as a base service set identifier (BSSID) MAC address. The PSK look-up engine 160 may send a message containing the BSSID MAC address to the directory server 180, and based on the BSSID MAC address, the directory server 180 retrieves (from the directory 184) data representing a pool 188 of candidate PSKs 190 corresponding to the BSSID MAC address. The directory server 180 may then send a message to the PSK look-up engine 160 containing data representing the pool 188 of candidate PSKs 190. As further described herein, the PSK look-up engine 160 may determine whether a given candidate PSK 190 is the client device PSK 111 by calculating a MIC value (called the "candidate MIC value" herein) based on the given candidate PSK 190 and comparing the candidate MIC value to the Message2 MIC value. In accordance with example implementations, when these MIC values are the same, then the candidate PSK 190 corresponds to the client device PSK 111.

In accordance with example implementations, by accessing the directory server 180 (e.g., access via a management server 196) one or multiple PSKs may be pre-registered for one or multiple client devices 110 by or on behalf of a given user. As an example, in accordance with some implementations, this registration may involve a user accessing a portal 182 that is provided by the directory server 180. In accordance with further implementations, the portal 182 may be provided by an entity other than the directory server 180. In accordance with example implementations, pre-registering PSKs for a particular wireless access point device 104 populates a corresponding pool 188 associated with the wireless access point device's BSSID MAC address. In accordance with example implementations, the pre-registration of the PSKs does not involve providing any of the associated client device MAC addresses. Moreover, in accordance with example implementations, the directory server 180, as part of the pre-registration process, associates PSKs 190 with their corresponding associated user roles 192. In accordance with example implementations, the directory server 180 may, at the time of pre-registration, determine the user role 192 for a particular PSK 190 based on the credentials of the user associated with the PSK.

In accordance with some implementations, the authenticator engine 108 may be formed by a hardware processor 112 of the wireless access point device 104. In accordance with some implementations, the hardware processor 112 may execute machine-readable instructions 116 (i.e., "software") that are stored in a memory 114 of the wireless access point device 104 to form the authenticator engine 108. The hardware processor 112 may include one or multiple processing cores (e.g., one or multiple central processing unit (CPU) cores of a single CPU package, or "socket," or multiple CPU cores of multiple sockets). In general, the memory devices that form the system memory 114, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with further implementations, the hardware processor 112 may not execute machine-readable instructions but instead be formed from dedicated hardware (e.g., logic gates) that performs one or multiple functions for the authenticator engine 108. In this manner, this dedicated hardware may, depending on the particular implementation, include one or more of the following: an application specific integrated circuit (ASIC), a field programmable gate array (FPGA), a complex programmable logic device (CPLD), or other hardware component(s).

In accordance with example implementations, the PSK look-up engine 160 may be formed by a hardware processor 170 of the authentication server 150. In accordance with some implementations, the hardware processor 170 may execute machine-readable instructions 178 that are stored in a memory 174 of the authentication server 150. The hardware processor 170 may include one or multiple processing cores (e.g., one or multiple CPU cores of a single socket, CPU cores of multiple sockets, or one or multiple graphics processing unit (GPU) processing cores). In accordance with further implementations, the hardware processor 170 may be formed from dedicated hardware (e.g., an ASIC, FPGA, CPLD or other hardware component(s)) that performs one or multiple functions for the PSK look-up engine 160 without executing machine-readable instructions.

Figure 2:
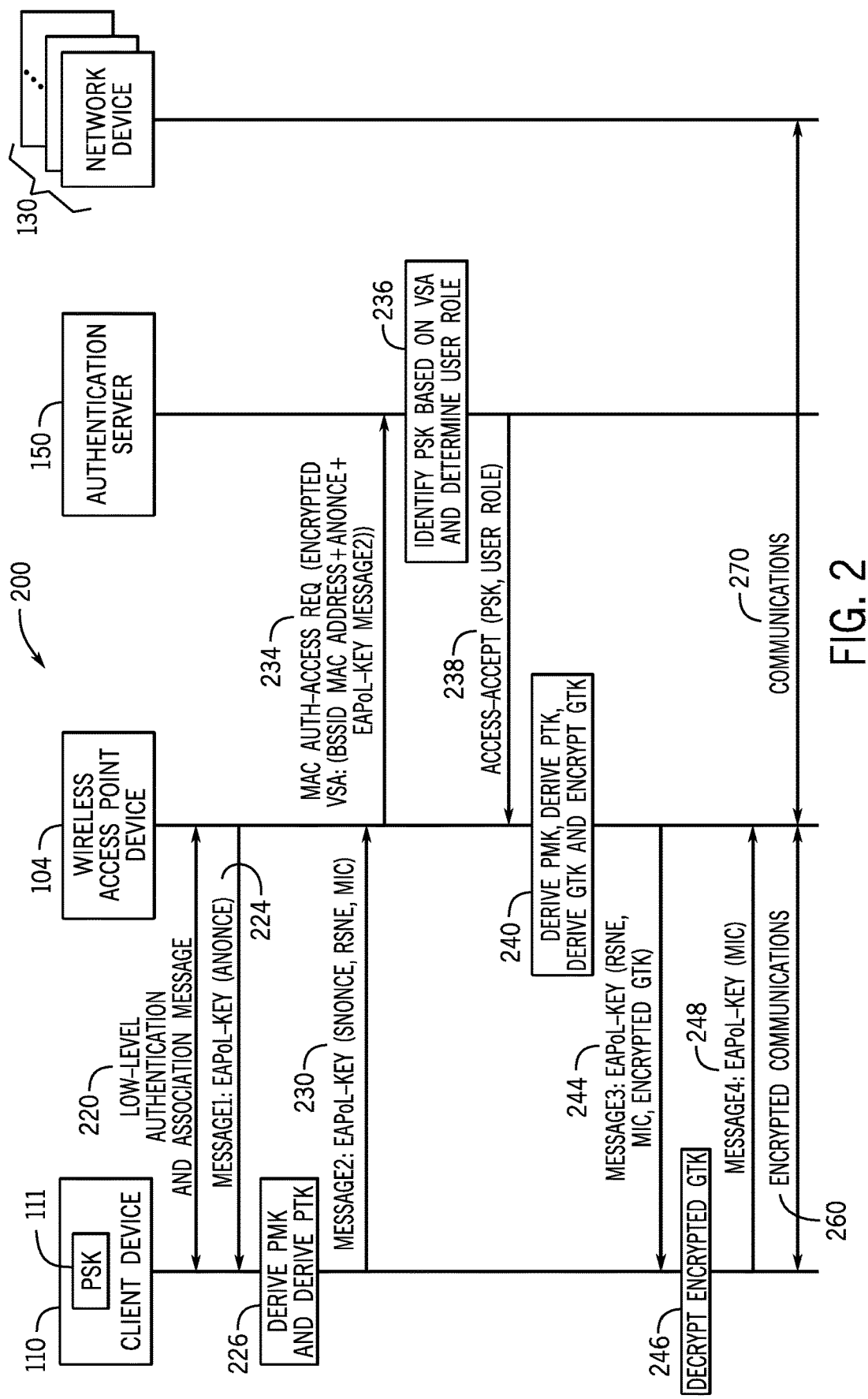
FIG. 2 is a message flow diagram illustrating messages communicated among the client device, the wireless access point device and the authentication server for purposes of onboarding the client device according to an example implementation.

FIG. 2 depicts a message flow diagram 200 corresponding to an onboarding process when a client device 110 first connects to a wireless access point device 104. FIG. 2 depicts messages being communicated among the client device 110, wireless access point device 104 and authentication server 150. Referring to FIG. 2, in accordance with example implementations, the onboarding process first includes a low-level authentication and association, which is proceeded by a high-level authentication. More specifically, as depicted at 220, the onboarding process begins with an exchange of messages between the client device 110 and the wireless access point device 104 relating to a low-level authentication (e.g., IEEE 802.11 open system authentication) and association of the client device 110 with the wireless access point device 104. As a result of the exchange of messages 220, the client device 110 has a state in which the client device 110 has been low-level authenticated and is associated with the wireless access point device 104.

Next, the client device 110 and the wireless access point device 104 exchange messages for purposes of performing a high-level authentication. In accordance with example implementations, the exchange of messages may be a "four-way handshake" according to an Extensible Authentication Protocol (EAP) over LAN, or "EAPoL," protocol that is described in Request for Comment (RFC) 3580, which published on Jan. 21, 2020, and described in the Institute of Electrical and Electronics Engineers (IEEE) 802.1X-2020 standard, which published on Feb. 28, 2020 (herein called the "IEEE 802.1X standard"). The four-way handshake includes the communication of messages that correspond to four key management frames, or EAPoL key frames, which are represented by the notation "EAPoL-Key ( )" in FIG. 2.

At the beginning of the four-way handshake, the wireless access point device 104 does not know the client device PSK 111. The four-way handshake begins with the wireless access point device 104 sending a first message 224 (called "Message1 224" in FIG. 2) to the client device 110. Message1 224 contains a nonce (called the "ANONCE" herein) that is generated by the wireless access point device 104. In general, a "nonce" is an arbitrary number, such as a random or pseudorandom number.

The client device 110 may generate another nonce, called the "SNONCE." After receiving Message1 224, the client device 110 has the ANONCE, and moreover, the client device 110 knows the SNONCE and the client device PSK 111. With this information, the client device 110 may derive a pairwise master key (PMK) and a pairwise transient key (PTK), as depicted at 226. In accordance with example implementations, a component temporal key (TK) of the PTK is used to encrypt and decrypt unicast data that is communicated between the client device 110 and the wireless access point device 104 (e.g., encrypted data communicated as part of an EAP tunnel), assuming that the client device 110 passes the high-level authentication and is authorized to access the network.

In accordance with example implementations, neither the client device PSK 111, the PMK nor the PTK are communicated between the client device 110 and the wireless access point device 104. Instead, as further described herein, the wireless access point device 104 receives the client device PSK 111 from the authentication server 150, and the wireless access point device 104 independently derives the PMK and PTK. The four-way handshake further includes a second message (called "Message2 230" in FIG. 2), which is sent by the client device 110. As depicted in FIG. 2, Message2 230 includes the SNONCE and further contains a MIC value (referred to as the Message2 MIC value" herein) and a robust security network element (RSNE) value. The RSNE value represents cryptographic cipher and authentication method capabilities of the client device 110. Upon receipt of Message2 230, the wireless access point device 104 has information for the VSA for the client device 110 and may then request the client device PSK 111 from the authentication server 150. After receiving the client device PSK 111 from the authentication server 150, the wireless access point device 104 may derive the PMK and the PTK, as depicted at 240.

As depicted in FIG. 2, after receiving Message2 230 (and before sending the next message 244 of the four-way handshake to the client device 110), the wireless access point device 104 communicates with the authentication server 150 to retrieve the client device PSK 111. In accordance with example implementations, the wireless access point device 104 and the authentication server 150 communicate using RADIUS protocol messages. More specifically, in accordance with example implementations, the wireless access point device 104 generates and sends a MAC Authorization-Access Request RADIUS message 234 to the authentication server 150. The MAC Authorization-Access Request RADIUS message 234 contains the VSA (e.g., an encrypted VSA) for the client device 110. In accordance with some implementations, the VSA includes the following: the BSSID MAC address of the wireless access point device 104; the ANONCE; and the content of the entire Message2 230. Assuming that the client device PSK 111 has been pre-registered, based on the VSA, the authentication server 150 identifies the client device PSK 111, and the authentication server 150 also retrieves the user role that is associated with the client device PSK 111. The authentication server 150 then sends an Access-Accept RADIUS message 238 to the wireless access point device 104. In accordance with example implementations, the Access-Accept RADIUS message 238 contains data representing the client device PSK 111 and the associated user role.

After receiving the Access-Accept RADIUS message 238, the wireless access point device 104 may then derive the PMK and PTK, as depicted at 240. Moreover, as also depicted at 240, the wireless access point device 104 may derive a Group Temporal Key (GTK). The GTK is used to encrypt and decrypt multicast and broadcast data that is communicated between the client device 110 and the wireless access point device 104 (e.g., communicated in an EAP tunnel). The wireless access point device 104 sends the encrypted GTK to the client device 110 via a third message (called "Message3 244" in FIG. 2) of the four-way handshake. Message3 244 also contains an RSNE value that represents cryptographic cipher and authentication method capabilities of the wireless access point device 104. The GTK may be encrypted by the PTK or a key derived therefrom. As depicted at 246, the client device 110 decrypts the encrypted GTK and acknowledges receipt of the GTK via the fourth and final message (called "Message4 248" in FIG. 2) of the four-way handshake.

Using the PTK and GTK (or keys derived therefrom), the client device 110 and the wireless access point device 104 may communicate encrypted data, as depicted at 260. Moreover, the wireless access point device 104 may communicate data frames (e.g., data frames having content encrypted with key(s) other than key(s) derived from the PTK and GTK) from the client device 110 to network devices 130 and vice versa, as depicted at 270.

Figure 3:
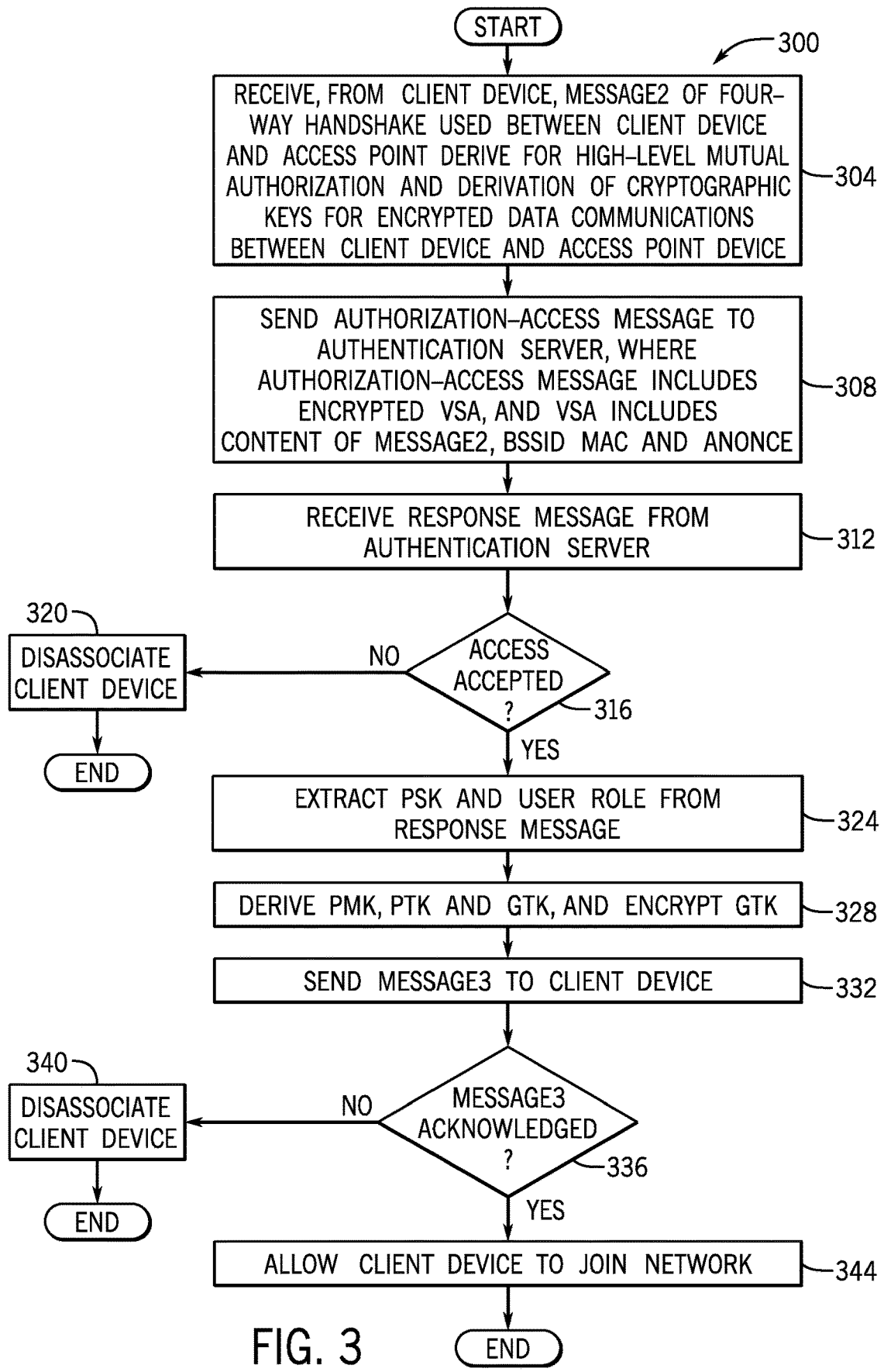
FIG. 3 is a flow diagram depicting a process performed by the wireless access point device to acquire a pre-shared key and a user role for the client device and derive cryptographic keys from the acquired pre-shared key according to an example implementation.

FIG. 3 depicts a process 300 that may be used by a wireless access point device for purposes of retrieving a PSK for a client device. As an example, in accordance with some implementations, the process 300 may be performed by an authenticator engine of the wireless access point device, such as the authenticator engine 108 (FIG. 1) of the wireless access point device 104. Referring to FIG. 3, in accordance with example implementations, the process 300 includes receiving (block 304), from a client device, Message2 of a four-way handshake that is used between the client device and the wireless access point device for purposes of performing high-level authorization and deriving cryptographic keys. The process 300 includes the wireless access point device sending (block 308) a MAC Authorization-Access message to the authentication server. The Authorization-Access message includes the content of Message2, a BSSID MAC address of the wireless access point device and the ANONCE that was generated by the wireless access point device as part of the four-way handshake.

As depicted in FIG. 3, pursuant to block 312, the wireless access point device receives a response message from the authentication server. If the response message is an Access-Accept message authorizing the client device to join the network, then, pursuant to block 324, the wireless access point device extracts the PSK and the user role from the response message and derives the PMK, PTK and GTK, pursuant to block 328.

In accordance with example implementations, the wireless access point device may derive the PMK using an equation that is the same as or similar to Equation 1 below:

$$PMK = PBKDF2(HMAC\text{-}SHA1, PSK, SSID, 4096, 256) \quad \text{Eq. 1}$$

In Equation 1, "PBKDF2" represents the Password-Based Key Derivation Function 2," as described in RFC 2898. "HMAC-SHA1" represents the application of a keyed hash function constructed from the SHA-1 hash algorithm. Also in Equation 1, "SSID" is the station set identifier of the wireless access point device and serves as a cryptographic salt. Moreover, in Equation 1, "4096" represents a number of iterations for the SHA-1 hash algorithm, and "256" represents the length (in bits) of the PMK.

Using the derived PMK, the wireless access point device may then derive the PTK using an equation that is similar to or the same as Equation 2 that is set forth below:

$$PTK = SHA1\_PRF(PMK, Len(PMK), \text{"Pairwise key expansion"}, MIN(AA,SA)\|MAX(AA,SA)\|MIN(AN,SN)\|MAX(AN,SN)) \quad \text{Eq. 2}$$

In Equation 2, "SHA1_PRF" represents a pseudorandom function that uses the SHA-1 hash algorithm; "AA" represents the BSSID MAC address; "SA" represents the MAC address of the client device 110; and "SN" represents the SNONCE; "AA" represents the ANONCE. "MIN(AA,SA)" represents the selection of the minimum of AA and SA. "MAX(AA,SA)" represents the selection of the maximum of AA and SA. Additionally, in Equation 2, "MIN(AN,SN)" represents the selection of the minimum of AN and SN; and "MAX(AN,SN)" represents the selection of the maximum of AN and SN. Also in Equation 2, "∥" represents a string concatenation operator.

The wireless access point device may then send (block 332) Message3 of the four-way handshake to the client device. If, pursuant to decision block 336, the client device acknowledges Message3 by sending Message4 of the four-way handshake, then the wireless access point device allows the client device to join the network, pursuant to block 344. Otherwise, in accordance with example implementations, the wireless access point device disassociates the client device (e.g., send a disassociation frame to the client device), pursuant to block 340. If, pursuant to decision block 316, the wireless access point device receives an Authorization-Reject message from the authentication server 150, then the wireless access point device may disassociate the client device, pursuant to block 320.

In the context used herein, a "hash" (which may also be referred to as a "hash," "hash value," "hash digest," "cryptographic hash," or "cryptographic hash value") is produced by the application of a cryptographic hash function to a value (e.g., an input, such as an image or binary). A "cryptographic hash function" may be a function that is provided through the execution of machine-executable instructions by a processor (e.g., one or multiple CPUs, one or multiple CPU processing cores, and so forth).

The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string. In accordance with example implementations, the cryptographic hash function may be a keyed cryptographic hash function that bases the hash generation on a message content and a cryptographic key that is provided as an input to the cryptographic hash function.

Figure 4:
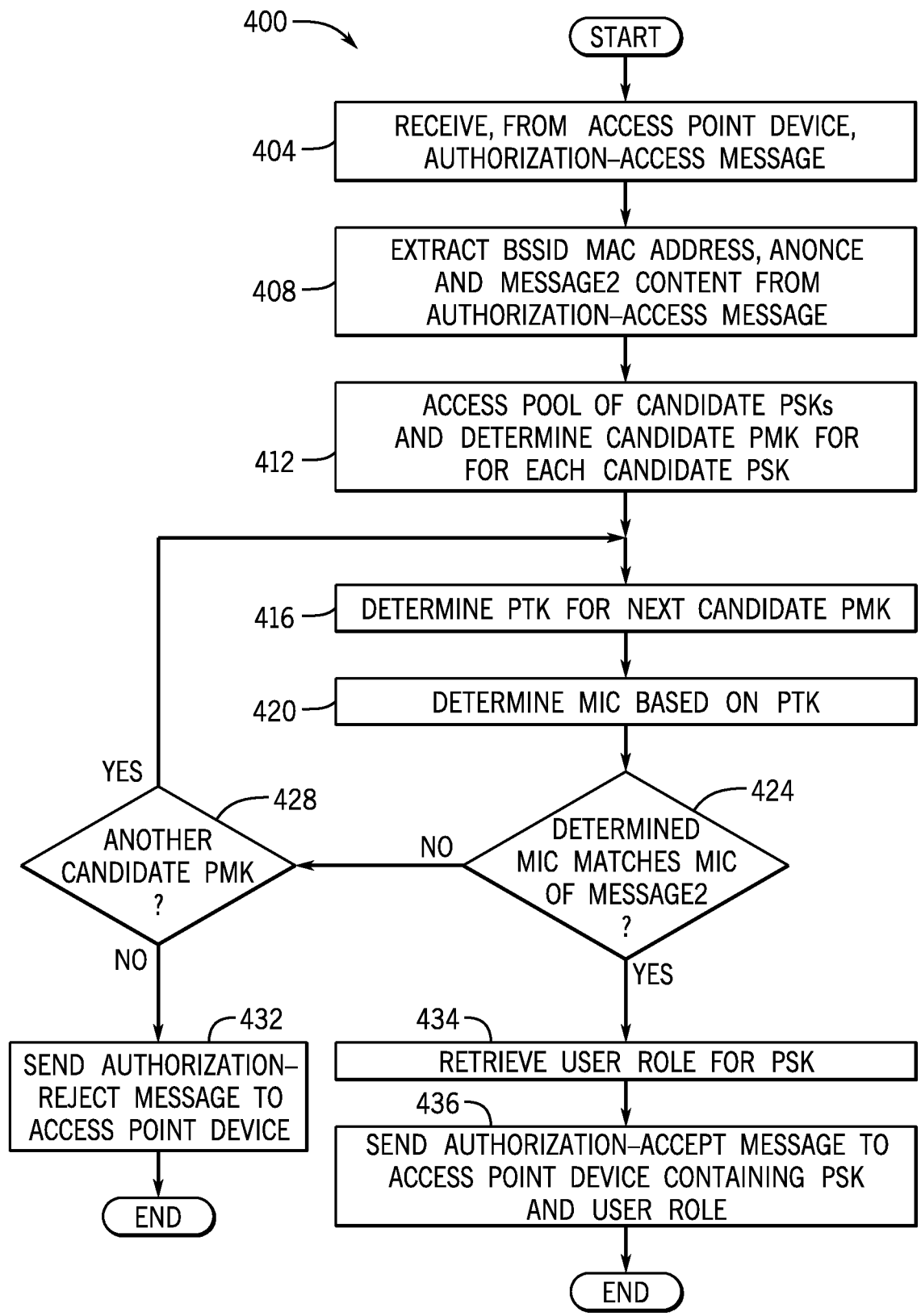
FIG. 4 is a flow diagram depicting a process used by the authentication server to identify a pre-shared key associated with the client device based on a message integrity check value according to an example implementation.

FIG. 4 depicts a process 400 that may be used by an authentication server according to example implementations. As an example, in accordance with some implementations, the process 400 may be performed by a MIC value-based PSK look-up engine similar to the MIC value-based PSK look-up engine 160 (FIG. 1) of the authentication server 150, in accordance with some implementations. Referring to FIG. 4, in accordance with example implementations, the process 400 includes the authentication server receiving (block 404), from a wireless access point device, a MAC Authorization-Access message. The process 400 includes the authentication server extracting (block 408) VSA from the MAC Authorization-Access message, such as a BSSID MAC address, ANONCE and Message2 content. At this point, the authentication server 150 has the information for identifying a client device PSK from a pool of candidate PSKs.

More specifically, in accordance with some implementations, the authentication server accesses (block 412) a pool of candidate PSKs and determines a candidate PMK for each candidate PSK. Accessing the pool of candidate PSKs may include the authentication server requesting, from a directory server, PSKs that have been registered for the wireless access point device's BSSID MAC address. The authentication server may determine each candidate PMK using the same key derivation function as the client device, such as, for example, Equation 1 above.

The authentication server may then begin, at block 416, an iterative subprocess for purposes of identifying the particular candidate PSK that corresponds to the client device PSK by calculating MIC values for candidate PMKs. More specifically, pursuant to block 416, the iterative subprocess includes the authentication server determining the PTK for the next candidate PMK using the same key derivation function used by the client device, such as Equation 2 above.

With the authentication server determining the PTK for the next candidate PMK, the authentication server may then determine (block 420) a candidate MIC value based on the PTK. Regardless of the particular keyed hash function that is used, the authentication server uses the same function as the client device as the same MIC value calculation methodology to calculate the candidate MIC value. As an example, in accordance with some implementations, the authentication server may use the following keyed hash function to calculate the candidate MIC value:

$$\text{Candidate}MIC = \text{HMAC\_SHA1}(Message2, message2\_length, KCK) \quad \text{Eq. 3}$$

In Equation 3, "HMAC_SHA1" represents a keyed SHA1 cryptographic hash function; "Message2" represents the entire second message of the four-way handshake; and "message2_length" represents the length (in bits) of Message2.

In accordance with example implementations, the candidate MIC value is derived using a key confirmation key (KCK) as the cryptographic key input for the hash algorithm. The KCK is part of the key lineage that begins with the PSK, and the KCK is a component key of the PTK, as described below:

$$PTK = KCK + KEK + TK \quad \text{Eq. 4}$$

In Equation 4, "KEK" is a key encryption key and "TK" is a temporal key.

Pursuant to decision block 424, in accordance with example implementations, the authentication server 150 determines whether the candidate MIC value determined in block 420 matches the MIC value of Message2. If so, then the associated PSK corresponds to the client device, and pursuant to block 434, the authentication server retrieves the user role associated with the PSK and sends (block 436) an Authorization-Accept message containing the client device PSK and the user role to the wireless access point device. Otherwise, if the MIC values do not match (decision block 424), then the authentication server determines (decision block 428) whether there are any more candidate PMKs to consider. If so, then control transitions back to block 416 to begin another iteration of the subprocess to evaluate another candidate PMK. Otherwise, the authentication server was unable to find a PSK for the client device, and the authentication server sends an Authorization-Reject message to the wireless access point device, pursuant to block 432.

Although wireless access point devices and wireless connections with client devices are specifically described herein, in accordance with further example implementations, an access point device and a client device may communicate via a wired connection, instead of communicate via a wireless connection. As such, an "access point device" may be a wireless access point device or a wired access point device. For example, an access point device and the client device may be connected by a network cable, and communications between the client device and the access point device occur over the network cable. Using the systems and networks that are described herein, the access point device may retrieve a PSK for the client device based on a MIC value in a message that is provided by the client device.

Figure 5:
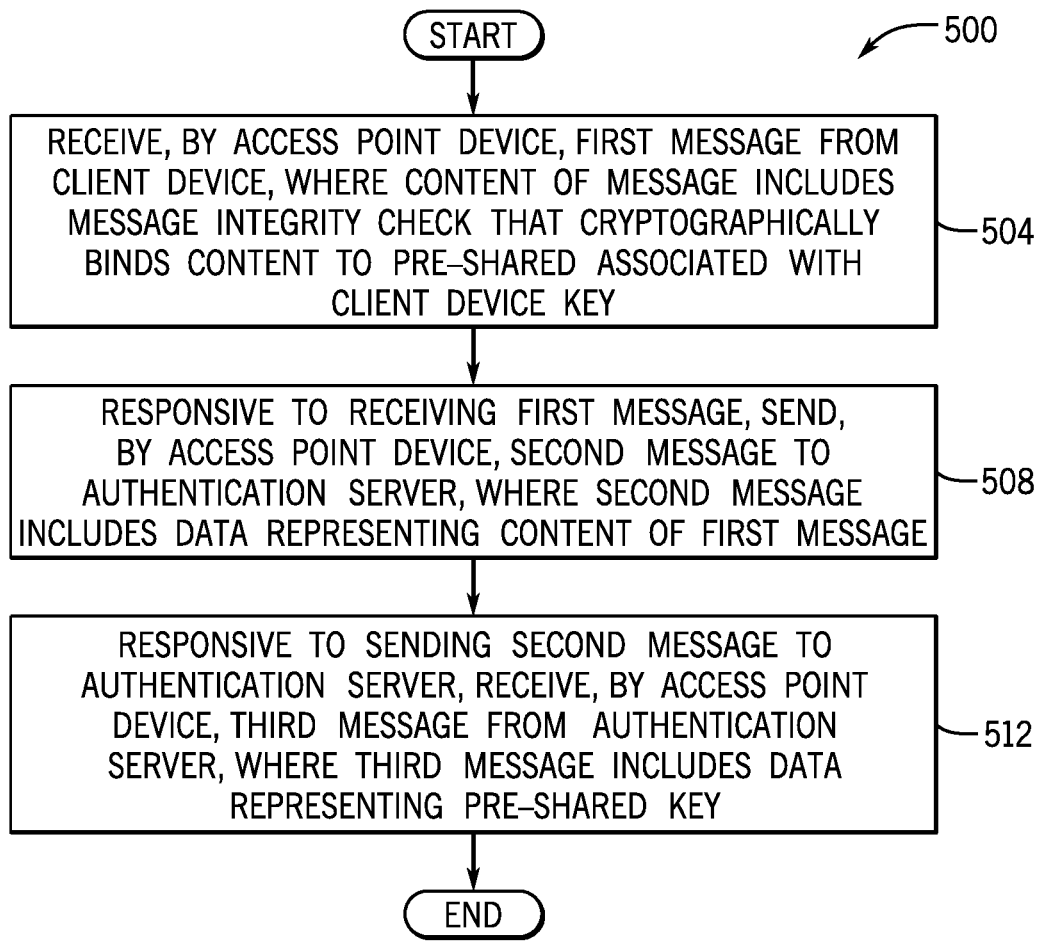
FIG. 5 is a flow diagram depicting a process used by an access point device to receive a pre-shared key associated with a client device based on a message integrity check value contained in a message from the client device according to an example implementation.

Referring to FIG. 5, in accordance with example implementations, a process 500 includes receiving (block 504), by a wireless access point device, a first message from a client device. In accordance with example implementations, the access point device and the client device may exchange messages in a four-way handshake may be in accordance with the EAPoL protocol that is described in RFC 3580 and in the IEEE 802.1X standard. In accordance with some implementations, the four-way handshake includes deriving cryptographic keys used to encrypt and decrypt data communicated between the client device and the access point device. The first message may be Message2 of a four-way handshake. The first message includes a content, and the content includes a message integrity check value that cryptographically binds the content of Message2 to a pre-shared key that is associated with the client device.

In accordance with some implementations, the pre-shared key may be a part of a plurality of pre-shared keys associated with the access point device. In accordance with example implementations, a pre-shared key may be pre-registered with a directory server of a network associated with the access point device. The registration of a pre-shared key for the client device, in accordance with example implementations, may not be associated with a particular identity (e.g., a MAC address) of the client device. The pre-shared key may be part of a pool of pre-shared keys that are registered with the directory server and are associated with a plurality of client devices that may connect to the access point device.

The process 500 includes, responsive to receiving the first message, sending (block 504), by the wireless access point device, a second message to an authentication server. In accordance with some implementations, the second message may be a RADIUS message, and, in accordance with example implementations, the second message may be a MAC Authorization-Access RADIUS message. The second message includes data representing the content of the first message. In accordance with some implementations, the content of the first message may be the entire content of Message2 of the four-way handshake. In accordance with example implementations, the second message may include a nonce generated by the access point device. In accordance with example implementations, the Message2 content may include a nonce that is generated by the client device.

The process 500 includes, responsive to sending the second message to the authentication server, receiving (block 512), by the wireless access point device, a third message from the authentication server. The third message includes data representing a pre-shared key associated with the client device. In accordance with some implementations, the third message may be an Authorization-Accept RADIUS message, which provides a pre-shared key for the client device. In accordance with some implementations, the Authorization-Accept RADIUS message may contain a user role that is associated with the pre-shared key.

Figure 6:
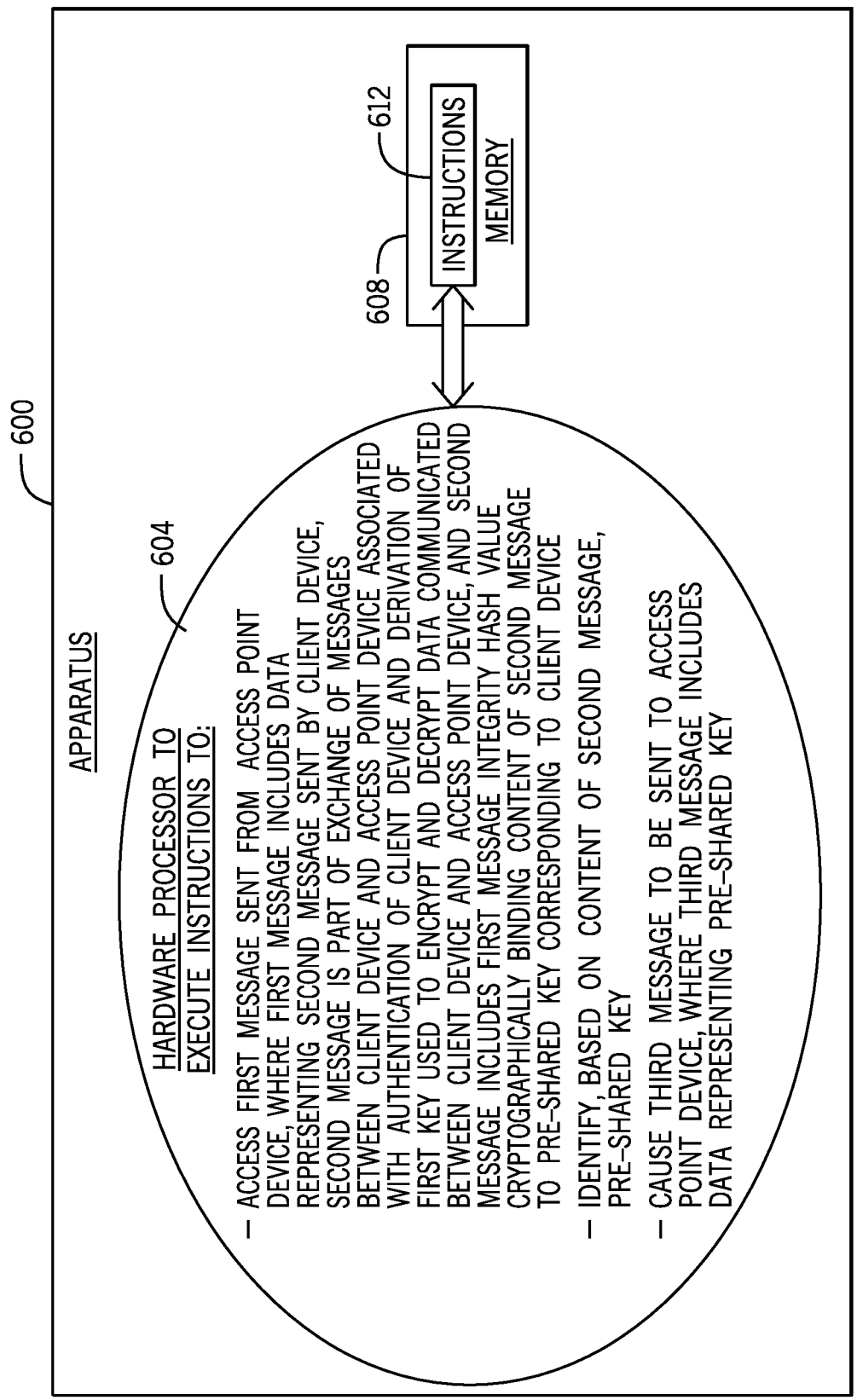
FIG. 6 is a block diagram of an apparatus having a hardware processor to identify a pre-shared key corresponding to a client device based on the content of a message provided by the client device according to an example implementation.

Referring to FIG. 6, in accordance with example implementations, an apparatus 600 includes a hardware processor 604 and a memory 608. In accordance with example implementations, the hardware processor 604 may include one or multiple processing cores, and the processing core(s) may be associated with one or multiple sockets. Moreover, in accordance with some implementations, the processing core(s) may include one or multiple GPU cores. The memory 608 stores instructions 612 that, when executed by the hardware processor 604, cause the hardware processor 604 to access a first message that is sent from an access point device. In accordance with example implementations, the first message may be a MAC Authorization-Access RADIUS message. The first message includes data that represents a second message that is sent by a client device.

The second message is part of an exchange of messages between the client device and the access point device associated with authentication of the client device and a derivation of a first key that is used to encrypt and decrypt data that is communicated between the client device and the wireless access point device. In accordance with example implementations, the second message may be Message2 of a four-way handshake of messages exchanged between the access point device and the client device. In accordance with example implementations, the four-way handshake may be in accordance with the EAPoL protocol that is described in RFC 3580 and in the IEEE 802.1X standard. In accordance with example implementations, the access point device and the client device may use the four-way handshake to derive a Pairwise Transient Key (PTK) and Group Temporal Key (GTK). A temporal key (TK) derived from the PTK may be used for purposes of encrypting and decrypting unicast data communicated between the access point device and the client device, and the GTK or a key derived therefrom may be used for purposes of encrypting and decrypting broadcast and multicast data between the client device and the access point device.

The second message includes a first message integrity check value. In accordance with some implementations, the message check integrity value is a hash value that is generated by the client device applying a keyed cryptographic hash algorithm to the content of Message2. In accordance with some implementations, the client device may use a key confirmation key (KCK), a part of the PTK, as an input to the cryptographic hash function. In accordance with some implementations, the client device may generate the message integrity check value by applying the keyed cryptographic hash function to the content of Message2, with all bits of a MIC field of Message2 being set to zero.

The instructions 612, when executed by the hardware processor 604, further cause the hardware processor 604 to identify, based on the second message, a pre-shared key that corresponds to the client device. The instructions 612, when executed by the hardware processor 604, further cause the hardware processor 604 to identify, based on the second message, a pre-shared key that corresponds to the client device.

In accordance with example implementations, the pre-shared key may be part of a plurality of pre-shared keys that are associated with the access point device and are pre-registered with a directory server. The pre-registration may not include, in accordance with example implementations, providing identifying information for the client devices, such as the client devices' MAC addresses.

In accordance with example implementations, the hardware processor 604 identifies the pre-shared key by calculating a second message integrity value based on a candidate pre-shared key and the content of Message2. If the message integrity check value calculated by the hardware processor 604 matches the message integrity check value of the second message, then, in accordance with example implementations, the hardware processor 604 identifies the corresponding pre-shared key as being the pre-shared key of the client device. The third message includes data representing the pre-shared key. In accordance with example implementations, the third message may be a MAC Authorization-Accept RADIUS message. In accordance with example implementations, the third message may further include data that represents a user role associated with the pre-shared key.

Figure 7:
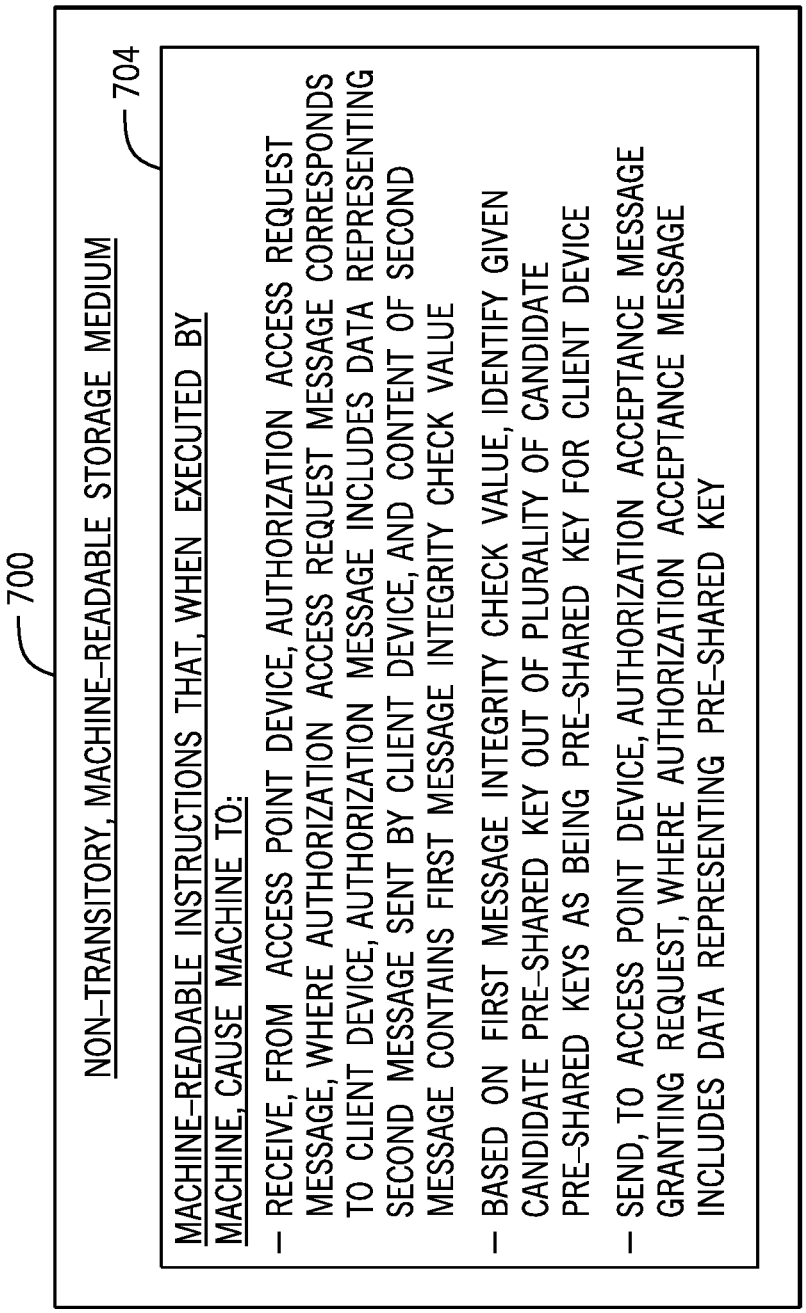
FIG. 7 is an illustration of machine-readable instructions stored on a non-transitory, machine-readable storage medium, which, when executed by a machine, cause the machine to identify a pre-shared key for a client device based on a message integrity check value according to an example implementation.

Referring to FIG. 7, in accordance with example implementations, a non-transitory machine-readable storage medium 700 stores machine-readable instructions 704 that, when executed by a machine, cause the machine to receive, from a wireless access point device, an authorization request message. In accordance with some implementations, the authorization request message may be a MAC Authorization-Access RADIUS message. The authorization request message corresponds to the client device.

The authorization message includes data representing a second message, which is sent by the client device. In accordance with example implementations, the second message may be Message2 of a four-way handshake between the client device and the access point device for purposes of performing a high-level authorization. In accordance with some implementations, the four-way handshake may further serve a purpose of generating one or multiple cryptographic keys used to encrypt and decrypt data communicated between the client device and the access point device. As an example, in accordance with some implementations, the cryptographic keys may be associated with a tunnel (e.g., an EAP tunnel).

In accordance with some implementations, the authorization request message may include vendor specific attributes associated with the client device. In accordance with some implementations, the vendor specific attributes may include the content of Message2, and a nonce generated by the access point device. The authorization message further includes a content of the second message, which contains a first message integrity check value. In accordance with some implementations, the first message integrity check value is generated by the client device through the application of a keyed cryptographic hash function. In accordance with some implementations, the keyed cryptographic hash function may receive, as inputs, a part of a pairwise transient key (PTK), a key confirmation key (KCK), and the content of Message2 as inputs.

The instructions 704, when executed by the machine, further cause the machine to, based on the first message integrity check value, identify a given candidate pre-shared key out of a plurality of candidate pre-shared keys as being a pre-shared key for the client device. In accordance with example implementations, the candidate pre-shared keys may be a pool of pre-registered pre-shared keys associated with the access point device. The pool of pre-registered keys may be associated with an identifier of the access point device, such as the access point's BSSID MAC address. In accordance with example implementations, the machine may calculate a candidate pairwise master key (PMK) for a given candidate pre-shared key, and based on the candidate PMK and the Message2 content, calculate a second message integrity check value. The machine may use the same keyed cryptographic hash function used by the client device to calculate the first message integrity check value. In accordance with example implementations, if the second message integrity check value is the same as the first message integrity check value, then the machine identifies the corresponding pre-shared key as being the pre-shared key for the client device.

The instructions 704, when executed by the machine, further cause the machine to send, to the access point device, an authorization acceptance message granting the request. In accordance with example implementations, the authorization acceptance message may be a MAC Access-Accept RADIUS message. The authorization acceptance message includes data that represents the pre-shared key for the client device. In accordance with example implementations, the authorization acceptance message may further include data that represents a use role associated with the pre-shared key.

In accordance with example implementations, the process further includes the wireless access point device communicating with a client device according to a handshake protocol to provide a first nonce that is generated by the wireless access point device to the client device and provide a second nonce that is generated by the client device to the access point device. The communication includes the access point device receiving the first message. The first message includes data that represents the second nonce. A particular advantage is that a pre-shared key may be associated with a client device without pre-registration of an identifier for the client device, such as the client device's MAC address.

In accordance with example implementations, the process further includes the access point device determining a temporal key based on the communication according to the handshake protocol, and the access point device using the temporal key to perform cryptographic operations on data communicated with the client device. A particular advantage is that a pre-shared key may be associated with a client device without pre-registration of an identifier for the client device, such as the client device's MAC address.

In accordance with example implementations, the process further includes determining, by the access point device, the temporal key based on the pre-shared key. A particular advantage is that a pre-shared key may be associated with a client device without pre-registration of an identifier for the client device, such as the client device's MAC address.

In accordance with further implementations, the second message further includes the first nonce. A particular advantage is that a pre-shared key may be associated with a client device without pre-registration of an identifier for the client device, such as the client device's MAC address.

In accordance with further implementations, the second message further includes a base station identifier of the access point device and a nonce that is generated by the access point device. A particular advantage is that a pre-shared key may be associated with a client device without pre-registration of an identifier for the client device, such as the client device's MAC address.

In accordance with example implementations, the first message includes an identifier for the access point device. Moreover, a plurality of candidate pre-shared keys are identified based on the identifier for the access point device, and the pre-shared key is selected from a plurality of pre-shared keys based on the second message. A particular advantage is that a pre-shared key may be associated with a client device without pre-registration of an identifier for the client device, such as the client device's MAC address.

In accordance with example implementations, a second message integrity check value is determined based on a candidate pre-shared key, the second message integrity hash is compared with the first message integrity hash, and based on the result of the comparison, the given candidate pre-shared key is selected as the pre-shared key. A particular advantage is that a pre-shared key may be associated with a client device without pre-registration of an identifier for the client device, such as the client device's MAC address.

In accordance with example implementations, a candidate pre-shared master key is determined based on the given candidate pre-shared key, and the second message integrity check value is determined based on the candidate pre-shared master key. A particular advantage is that a pre-shared key may be associated with a client device without pre-registration of an identifier for the client device, such as the client device's MAC address.

In accordance with example implementations, a candidate pairwise transient key is based on the candidate pre-shared master key, and the second message integrity hash is determined based on the candidate pairwise transient key. A particular advantage is that a pre-shared key may be associated with a client device without pre-registration of an identifier for the client device, such as the client device's MAC address.

In accordance with example implementations, the candidate pairwise transient key is determined based on a wireless network identifier. A particular advantage is that a pre-shared key may be associated with a client device without pre-registration of an identifier for the client device, such as the client device's MAC address.

In accordance with example implementations, a second message integrity check value is determined based on the candidate pre-shared key of a plurality of candidate pre-shared keys, a content of the second message, a link to the second message and the first message integrity value. The second message integrity value is compared with the first message integrity value. Based on a result of the comparison, the given candidate pre-shared key is selected as the pre-shared key. A particular advantage is that a pre-shared key may be associated with a client device without pre-registration of an identifier for the client device, such as the client device's MAC address.

In accordance with example implementations, the selection of the pre-shared key includes selecting the pre-shared key from a plurality of pre-shared keys that are registered for the access point device and associated with a plurality of client devices. A particular advantage is that a pre-shared key may be associated with a client device without pre-registration of an identifier for the client device, such as the client device's MAC address.

In accordance with example implementations, the first message corresponds to a request to authorize the client device to access the network, and the third message corresponds to the request being granted. A particular advantage is that a pre-shared key may be associated with a client device without pre-registration of an identifier for the client device, such as the client device's MAC address.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   accessing a first message sent from an access point device, wherein the first message comprises data representing a second message sent by a client device, wherein:
      the second message is part of an exchange of messages between the client device and the access point device associated with authentication of the client device and a derivation of a first key used to encrypt and decrypt data communicated between the client device and the access point device; and
      the second message comprises a first message integrity check value;
   identifying, based on the second message, a pre-shared key corresponding to the client device, wherein identifying the pre-shared key comprises:
      determining a second message integrity check value based on:
         a candidate pre-shared key of a plurality of candidate pre-shared keys;
         a content of the second message; and
         a length of the second message;
      comparing the second message integrity check value with the first message integrity check value; and
      based on a result of the comparison, selecting the given candidate pre-shared key as the pre-shared key;
   determining a user role based on the pre-shared key; and
   causing a third message to be sent to the access point device, wherein the third message comprises data representing the pre-shared key and data representing the user role.

2. The method of claim 1, wherein identifying the pre-shared key further comprises:
   applying a first key derivation function to determine, for each candidate pre-shared key of the plurality of candidate pre-shared keys, a candidate pre-shared master key based on the candidate pre-shared key to provide a plurality of candidate pre-shared master keys; and
   determine the second message integrity check value based on a given candidate pre-shared master key of the plurality of candidate pre-shared master keys.

3. The method of claim 2, wherein identifying the pre-shared key further comprises:
   apply a second key derivation function to determine, for the given candidate pre-shared master key, a pairwise temporal key; and
   determine the second message integrity check value based on the pairwise temporal key.

4. The method of claim 3, wherein:
   the pairwise temporal key comprises a key confirmation key; and
   identifying the pre-shared key further comprises determining the second message integrity check value based on the key confirmation key.

5. The method of claim 1, wherein identifying the pre-shared key further comprises:
   applying a cryptographic hash function to the content of the second message and the candidate pre-shared key to provide a hash value representing the second message integrity check value;
   comparing the hash value with the first message integrity check value; and
   based on the result of the comparison of the hash value with the first message integrity check value, selecting the given candidate pre-shared key as the pre-shared key.

6. The method of claim 1, wherein identifying the pre-shared key further comprises:
   identifying the plurality of candidate pre-shared keys based on a media access control (MAC) address of the access point device.

7. An apparatus comprising:
   a hardware processor; and
   a memory to store instructions, that, when executed by the hardware processor, cause the hardware processor to:
      access a first message sent from an access point device, wherein the first message comprises data representing a second message sent by a client device, wherein:
         the second message is part of an exchange of messages between the client device and the access point device associated with authentication of the client device and a derivation of a first key used to encrypt and decrypt data communicated between the client device and the access point device; and
         the second message comprises a first message integrity check value;
      identify, based on the second message, a pre-shared key corresponding to the client device, wherein identifying the pre-shared key comprises:
         determining a second message integrity check value based on:
            a candidate pre-shared key of a plurality of candidate pre-shared keys;
            a content of the second message; and
            a length of the second message;
         comparing the second message integrity check value with the first message integrity check value; and
         based on a result of the comparison, selecting the given candidate pre-shared key as the pre-shared key;
      determine a user role based on the pre-shared key; and
      cause a third message to be sent to the access point device, wherein the third message comprises data representing the pre-shared key and data representing the user role.

8. The apparatus of claim 7, wherein:
   the first message comprises an identifier for the access point device; and
   the instructions, when executed by the hardware processor, further cause the hardware processor to identify the plurality of candidate pre-shared keys based on the identifier for the access point device.

9. The apparatus of claim 7, wherein the instructions, when executed by the hardware processor, further cause the hardware processor to:
   apply a cryptographic hash function to the content of the second message and the candidate pre-shared key to provide a hash value representing the second message integrity check value;

compare the hash value with the first message integrity check value; and based on the result of the comparison of the hash value with the first message integrity check value, select the given candidate pre-shared key as the pre-shared key.

10. The apparatus of claim 7, wherein the instructions, when executed by the hardware processor, further cause the hardware processor to:
determine a candidate pre-shared master key based on the given candidate pre-shared key; and
determine the second message integrity check value based on the candidate pre-shared master key.

11. The apparatus of claim 10, wherein the instructions, when executed by the hardware processor, further cause the hardware processor to:
determine a candidate pairwise transient key based on the candidate pre-shared master key; and
determine the second message integrity check value based on the candidate pairwise transient key.

12. The apparatus of claim 11, wherein the instructions, when executed by the hardware processor, further cause the hardware processor to determine the candidate pairwise transient key based on a wireless network identifier.

13. The apparatus of claim 7, wherein the instructions, when executed by the hardware processor, further cause the hardware processor to select the plurality of candidate pre-shared keys based on a media access control (MAC) address corresponding to the access point device.

14. The apparatus of claim 7, wherein the first message corresponds to a request to authorize the client device to access a network, and the third message corresponds to the request being granted.

15. A non-transitory machine-readable storage medium that stores machine-readable instructions that, when executed by a machine, cause the machine to:
receive, from an access point device, an authorization request message, wherein the authorization request message corresponds to an authorization for a client device to access a network via the access point device, the authorization message comprising data representing a second message sent by the client device, and a content of the second message containing a message content cryptographically bound, via a first message integrity check value, to a first pre-shared key;
access a directory comprising a plurality of candidate pre-shared keys;
based on the message content, identify a given candidate pre-shared key of the plurality candidate pre-shared keys as being the first pre-shared key, wherein identifying the given candidate pre-shared key comprises:
determining a second message integrity check value based on;
a candidate pre-shared key of a plurality of candidate pre-shared keys;
a content of the second message; and
a length of the second message;
comparing the second message integrity check value with the first message integrity check value; and
based on a result of the comparison, selecting the given candidate pre-shared key as the first pre-shared key;
determine a user role based on the first pre-shared key; and
send, to the access point device, an authorization acceptance message to allow the client device to access the network, wherein the authorization acceptance message comprises data representing the first pre-shared key and data representing the user role.

16. The non-transitory machine-readable storage medium of claim 15, wherein the instructions, when executed by the machine, further cause the machine to:
apply a first key derivation function to determine, for each candidate pre-shared key of the plurality of candidate pre-shared keys, a candidate pre-shared master key based on the candidate pre-shared key to provide a plurality of candidate pre-shared master keys; and
determine the second message integrity check value based on a given candidate pre-shared master key of the plurality of candidate pre-shared master keys.

17. The non-transitory machine-readable storage medium of claim 16, wherein the instructions, when executed by the machine, further cause the machine to:
apply a second key derivation function to determine, for the given candidate pre-shared master key, a pairwise temporal key; and
determine the second message integrity check value based on the pairwise temporal key.

18. The non-transitory machine-readable storage medium of claim 17, wherein the pairwise temporal key comprises a key confirmation key, and the instructions, when executed by the machine, further cause the machine to determine the second message integrity check value based on the key confirmation key.

19. The non-transitory machine-readable storage medium of claim 15, wherein the instructions, when executed by the machine, further cause the machine to identify the plurality of candidate pre-shared keys based on a media access control (MAC) address of the access point device.

* * * * *